United States Patent [19]

Sasaki

[11] Patent Number: 4,573,793
[45] Date of Patent: Mar. 4, 1986

[54] SPECTROPHOTOMETER AUTOMATIC ADJUSTMENT FOR DIFFERENCES BETWEEN NOMINAL AND ACTUAL WAVELENGTH SETTINGS

[75] Inventor: Kikuo Sasaki, Kyoto, Japan

[73] Assignee: Shimadzu Corporation, Kyoto, Japan

[21] Appl. No.: 564,889

[22] Filed: Dec. 23, 1983

[30] Foreign Application Priority Data

Dec. 30, 1982 [JP] Japan .................................. 57-228244

[51] Int. Cl.$^4$ .............................. G01J 3/18; G01J 3/04
[52] U.S. Cl. ...................................... 356/326; 356/334
[58] Field of Search ............... 356/319, 320, 323, 324, 356/325, 326, 328, 331, 332, 334; 364/498

[56] References Cited

U.S. PATENT DOCUMENTS

| | | | |
|---|---|---|---|
| 4,171,913 | 10/1979 | Wildy et al. | 356/325 |
| 4,227,811 | 10/1980 | Tohyama et al. | 356/320 |
| 4,325,634 | 4/1982 | Tohyama | 356/332 |
| 4,437,763 | 3/1984 | Kaye | 356/326 |

Primary Examiner—F. L. Evans
Assistant Examiner—Joel L. Harringa
Attorney, Agent, or Firm—Fidelman, Wolffe & Waldron

[57] ABSTRACT

A spectrophotometer wherein in order to set the instrument to a designated wavelength, the monochromator is first set to the designated wavelength position intended to be as such on the monochromator, and the entrance and exit slits of the monochromator are widened so as to measure a beam of light having a spectrum with an emission line at the designated wavelength, and the sensitivity of the light measuring circuit is so adjusted that the output therefrom is kept at a predetermined constant level, and then the slits are narrowed, whereupon wavelength scanning is conducted over a range of wavelengths including the designated wavelength so as to detect a peak in the emission line spectrum, and then the dispersing element is set to the detected peak position.

A microcomputer controls the above operation in a sequential manner.

6 Claims, 6 Drawing Figures

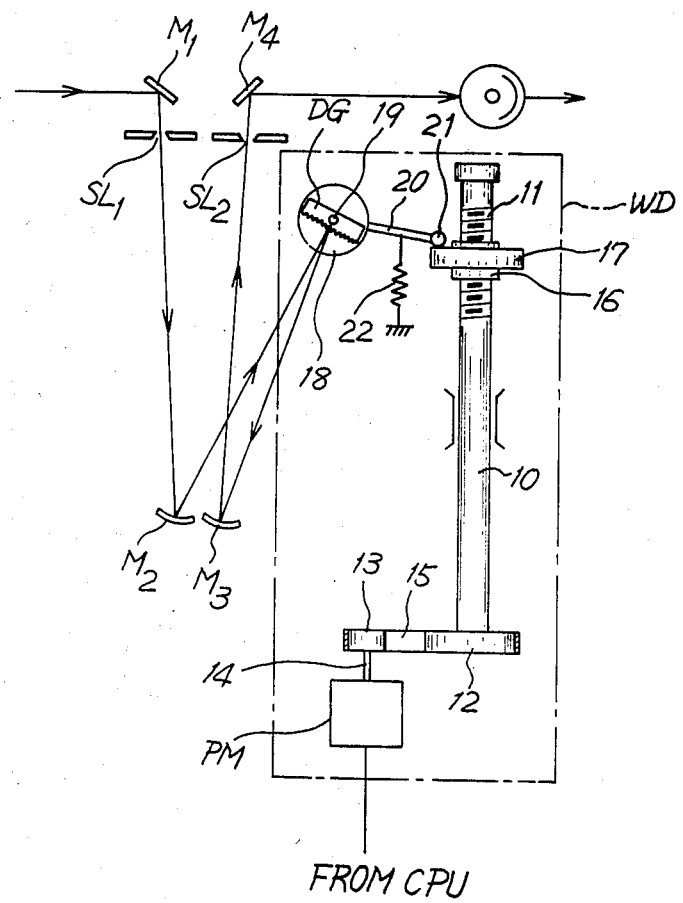

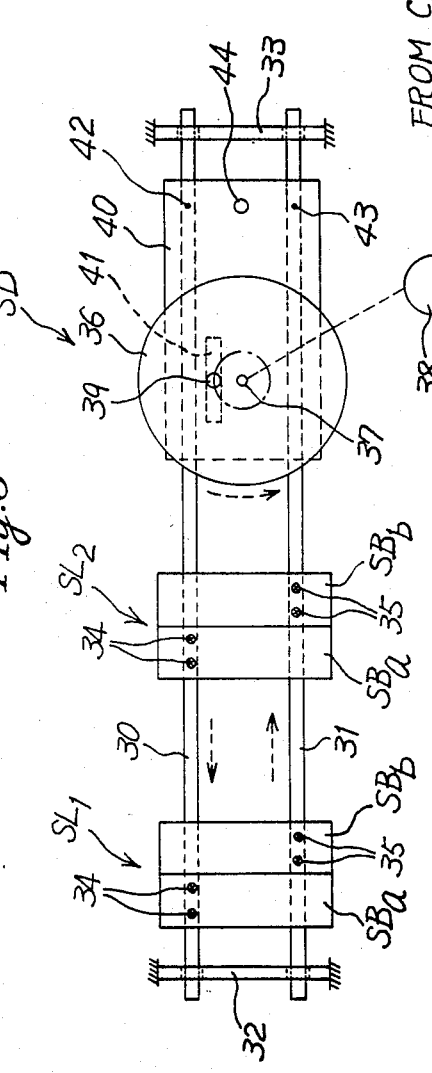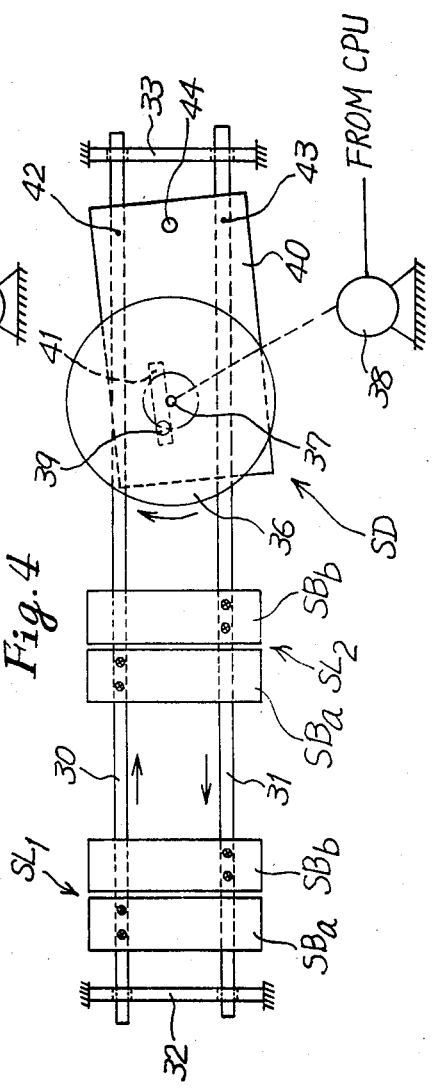

SPECTROPHOTOMETER AUTOMATIC ADJUSTMENT FOR DIFFERENCES BETWEEN NOMINAL AND ACTUAL WAVELENGTH SETTINGS

BACKGROUND OF THE INVENTION

This invention relates to a spectrophotometer in which the wavelength of the light to be measured and the slit width of the monochromator can automatically be adjusted to a designated value.

Spectrophotometers are provided with a monochromator which comprises an entrance and an exit slit and a dispersing element such as a diffraction grating so arranged as to be automatically or manually set to provide a designated wavelength at the exit slit. Practically, however, the wavelength actually obtained at the exit slit is more or less displaced from the designated wavelength. In other words, there always exists an error in wavelength selection. In the spectrophotometer in which the monochromator is automatically set to a designated wavelength, it is necessary to correct the above-mentioned error. Manual correction of the error by the operator is not only troublesome but also time-consuming.

Accordingly, the primary object of the invention is to provide a spectrophotometer in which errors in wavelength selection can automatically be corrected.

SUMMARY OF THE INVENTION

In accordance with the invention, when a wavelength is designated, the grating of the monochromator is driven to the designated wavelength. Then the slits of the monochromator are widened to such a width as to be able to cover a predetermined range of wavelength scanning, whereupon a beam of light having a spectrum including an emission line at the designated wavelength is introduced into the monochromator, and with a gain control circuit connected to the light measuring circuit, the gain of the light measuring circuit is so adjusted that the output thereof reaches a predetermined constant level, whereupon the gain control circuit is disconnected from the measuring circuit. Then the slits of the monochromator are narrowed to a predetermined width, whereupon wavelength scanning is conducted over the above-mentioned range of wavelength scanning for detection of a peak value of the output of the measuring circuit and the grating is set to the position where a peak has been detected. A microcomputer sequentially controls the above operation in accordance with a predetermined program.

To explain the above operation in detail, at first the grating of the monochromator is driven simply to the position of a designated wavelength $\lambda'p$ which is intended on the monochromator to coincide with the wavelength of a peak of the emission line spectrum of a sample element to be measured. Due to mechanical errors or some other causes, however, the designated wavelength $\lambda'p$ is displaced a minute wavelength width $\Delta\lambda e$ from the actual wavelength $\lambda p$ of the peak, that is, $\lambda'p = \lambda p \pm \Delta\lambda e$.

In accordance with the invention, wavelength scanning within a small wavelength range is conducted to detect the position of a peak in the emission line spectrum, and to conduct the scanning the slits of the monochromator are broadened to such a width as to cover the range of wavelength scanning. Should there be a difference caused by the design of the monochromator between the wavelength designated and the wavelength actually obtained, substantially the whole emission line spectrum of the light that has entered the monochromator is necessarily covered by the scanning range provided that the range of wavelength scanning was determined beforehand in view of the particular accuracy of wavelength of the monochromator so as to include substantially the whole emission line spectrum of an element to be measured.

If the slits are of such a narrow width that only a portion of the emission line spectrum can be taken out, as a peak or emission line of the spectrum of a sample under measurement approaches the slits in the course of subsequent scanning for the peak or emission line, the output of the light measuring circuit becomes so great that the amplifier is saturated thereby to make it impossible to detect a peak in the output of the measuring circuit. Therefore, the slits are widened in the above-mentioned manner so that wherever the designated wavelength lies within the above-mentioned scanning range, the output of the measuring circuit is at the same level.

With the slits of the monochromator having been widened in the above manner, the light whose spectrum includes an emission line at the designated wavelength is introduced into the monochromator, and the light emerging from the monochromator is measured by the measuring circuit with the gain control circuit connected thereto being so adjusted that the output of the measuring circuit becomes a predetermined value, whereupon the gain control circuit is disconnected from the measuring circuit. Then the slits of the monochromator are narrowed and the grating is driven for wavelength scanning. In this manner it is possible to detect without fail the peak of the spectrum of the light emerging from the monochromator thereby to set the grating to the correct wavelength position.

BRIEF DESCRIPTION OF THE DRAWING

FIG. 2 shows a concrete arrangement of the wavelength setting device shown as a mere block in FIG. 1;

FIG. 3 shows a concrete arrangement of the slit width setting device shown as a mere block in FIG. 1;

FIG. 4 shows the device of FIG. 3 in a different operative position;

PREFERRED EMBODIMENT OF THE INVENTION

Figure 1:
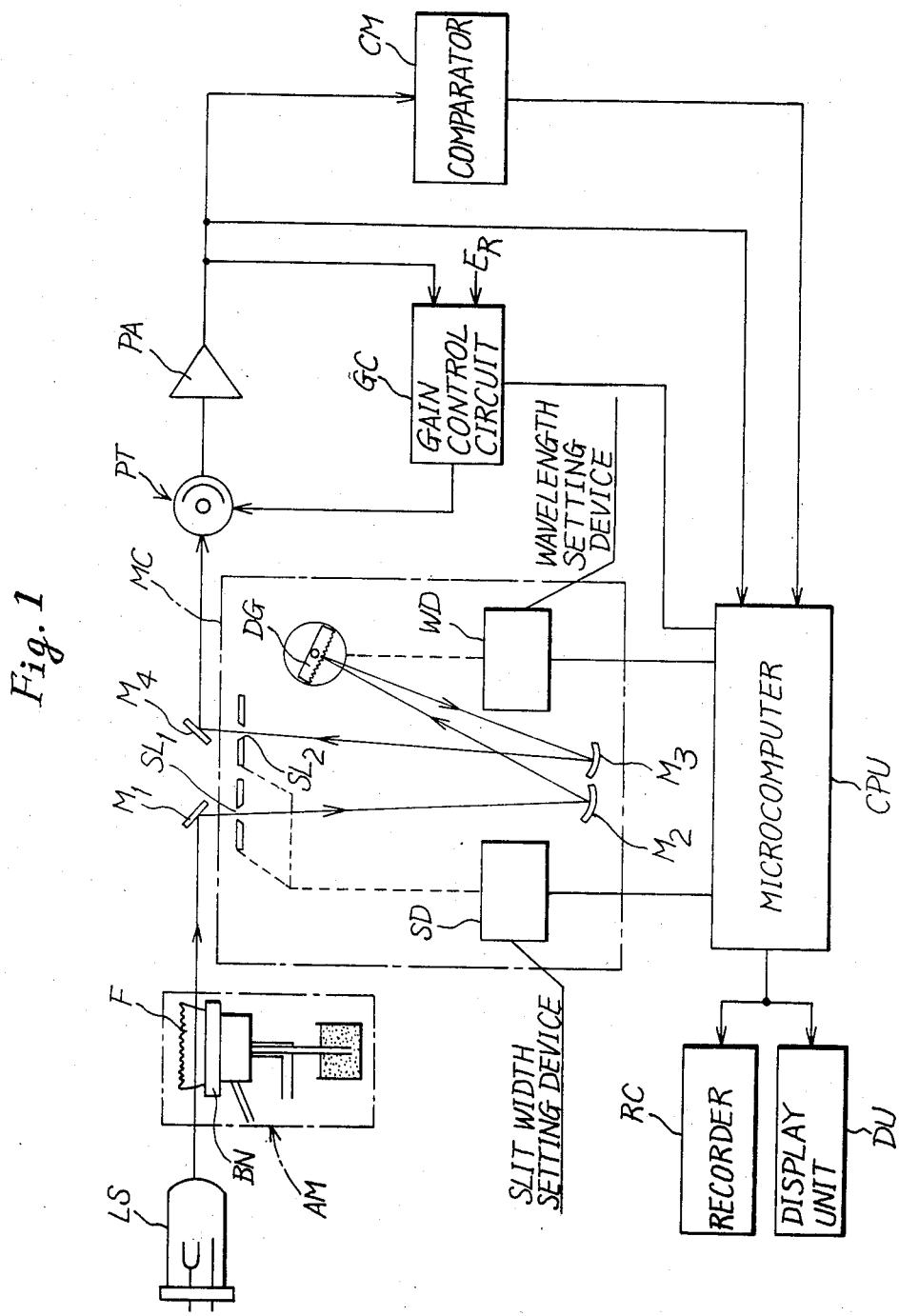
FIG. 1 is a schematic diagram of one embodiment of the invention.

Referring now to the drawings, there is schematically shown in FIG. 1 one embodiment of the invention in the form of an atomic absorption spectrophotometer which comprises a source of light LS, an atomizer AM, a monochromator MC and a photodetector PT.

The light source LS comprises a hollow-cathode lamp which gives a sharp emission line or lines of a specific element to be measured. The atomizer AM includes a burner BN which provides a flame F for atomizing a sample to be measured.

The monochromator MC includes an entrance slit $SL_1$, an exit slit $SL_2$, a diffraction grating DG, and a pair of concave mirrors $M_2$ and $M_3$. The light from the atomizer AM is reflected by a plain mirror $M_1$ to enter the monochromator MC through the entrance slit $SL_1$ and rendered parallel by the collimating mirror $M_2$ and then dispersed by the grating DG into a series of wavelengths, which are converged by the focusing mirror $M_3$ to pass through the exit slit $SL_2$.

A wavelength setting device WD is controlled by a microcomputer CPU so as to control the grating DG in a manner to be described later in detail to adjust the grating DG so that the monochromatic light of a designated wavelength is taken out of the exit slit $SL_2$.

The microcomputer CPU also controls a slit width setting device SD in relation to wavelength setting as will be described later in detail.

The result of a measurement is displayed on a suitable display unit DU and/or recorded by a recorder RC.

FIG. 2 shows an example of the wavelength setting device WD, which comprises a shaft 10 having an externally threaded portion 11 formed thereon and a pulley 12 fixed to one end thereof. Another pulley 13 is fixed to the output shaft 14 of a pulse motor PM. An endless belt 15 extends between the two pulleys 12 and 13 so that rotation of the motor PM causes the shaft 10 to be rotated. The rotation of the motor PM is controlled by the microcomputer CPU. A nut 16 engages the threaded portion 11 of the shaft 10 so as to be moved axially of the shaft 10 as the shaft is rotated. A cam plate 17 is fixed to the nut 16 for simultaneous movement therewith axially of the shaft.

The diffraction grating DG is fixedly mounted on a turntable 18 which is rotatable about an axis 19. A lever 20 is fixed at one end to the turntable 18 and has its opposite end formed into a ball 21. A spring 22 urges the lever 20 so that the ball 21 abuts on the cam plate 17. As will be easily seen, upon rotation of the motor PM the lever 20 causes the turntable 18 and the grating DG thereon to be turned about the axis 19 so that a selected one of the wavelengths of the dispersed light can be taken out of the exit slit $SL_2$.

FIGS. 3 and 4 show an example of the slit width setting device SD. Each of the entrance and exit slits $SL_1$ and $SL_2$ comprises a pair of slit blades $SB_a$ and $SB_b$ whose opposed edges define a slit therebetween. A pair of parallel rods 30 and 31 are supported by a pair of bearing members 32 and 33 so as to be axially slidable. The slit blades $SB_a$ of the entrance and exit slits are fixed as at 34 to one of the two parallel rods, say, the rod 30 while the slit blades $SB_b$ of the two slits are fixed as at 35 to the other rod 31.

A rotary disk 36 is fixed to a shaft 37 and a motor 38 rotates the shaft 37 and the disk 36 fixed thereto. An eccentric pin 39 is fixed to one side of the rotary disk 36 perpendicularly thereto so as to project axially of the shaft 37. A cam plate 40 is formed with a slot 41 in which the eccentric pin 39 on the rotary disk 36 is engaged. The cam 40 is pivoted to the two parallel rods 30 and 31 as at 42 and 43, respectively, and is rotatable about a pivot pin 44.

When the motor 38 rotates the rotary disk 36 in either direction, say, counterclockwise as indicated by a dotted line arrow from the illustrated original position, the eccentric pin 39 engaged in the slot 41 causes the cam plate 40 to slightly turn counterclockwise about its pivot 44. This causes the diametrically opposite pivot pins 42 and 43 to turn counterclockwise about the cam pivot 44 thereby to slightly move the rod 30 and the slit blades $SB_a$ fixed thereon toward the left and the other rod 31 and the slit blades $SB_b$ fixed thereon toward the right, both as indicated by dotted line arrows, so that both the entrance and exit slits $SL_1$ and $SL_2$ are simultaneously opened to the same width as shown in FIG. 4.

When the motor 38 rotates the rotary disk 36 in the opposite direction from the position shown in FIG. 4, that is, clockwise as shown by a solid line arrow, the eccentric pin 39 engaged in the slot 41 causes the cam plate 40 to slightly turn clockwise about its pivot 44 so that both the entrance and exit slits are simultaneously narrowed to the same width. The direction and angle of rotation of the motor 38 are controlled by the microcomputer CPU.

The photodetector PT comprises a photomultiplier tube which receives the monochromatic light emerging out of the exit slit $SL_2$ of the monochromator MC and reflected by a plane mirror $M_4$ to produce a corresponding electrical signal, which is amplified by a preamplifier PA. A gain control circuit GC compares the output from the preamplifier PA with a reference voltage $E_R$ to control the direct current high voltage impressed on the photomultiplier tube PT in such a manner that the output from the preamplifier PA becomes equal to the reference voltage $E_R$.

Figure 5:
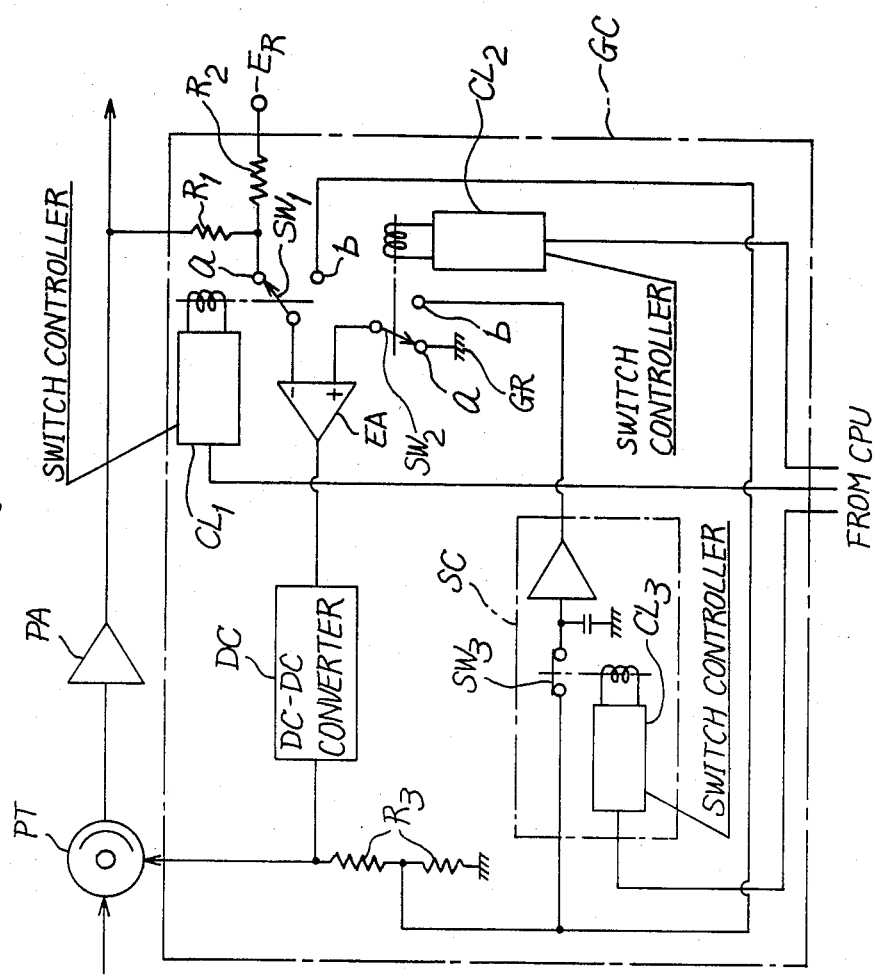
FIG. 5 is an electrical circuit diagram of the automatic gain control circuit used in the apparatus of FIG. 1.

FIG. 5 shows an example of the gain control circuit GC in detail. The circuit is provided with three switches $SW_1$, $SW_2$ and $SW_3$, which are controlled by switch controllers $CL_1$, $CL_2$ and $CL_3$ respectively. In the wavelength setting mode of the monochromator MC the microcomputer CPU controls the switch controller $CL_3$ to keep the switch $SW_3$ closed and the switch controllers $CL_1$ and $CL_2$ to keep the switches $SW_1$ and $SW_2$ closed at the contact a, so that the output from the preamplifier PA is applied through a resistor $R_1$ to the negative input terminal of an error amplifier EA, to which the abovementioned reference voltage is applied as a negative voltage $-E_R$ through a resistor $R_2$ having the same resistance as the resistor $R_1$. If the output from the preamplifier PA is equal to the reference voltage $E_R$, the input to the negative terminal of the error amplifier EA is zero. With the switch $SW_2$ closed at the contact a, the positive input terminal of the error amplifier EA is grounded as at GR.

A DC-DC converter DC converts the output from the error amplifier EA to a high direct current voltage to be fed back to the dynode of the photomultiplier tube PT thereby to keep the output of the photomultiplier tube PT constant and the output of the preamplifier PA at the value $E_R$. The output of the DC-DC converter is also applied through voltage dividing resistors $R_3$ to a storing circuit SC.

As previously mentioned, in the wavelength setting mode the microcomputer CPU controls both the slit width setting device SD to open the entrance and exit slits $SL_1$ and $SL_2$ of the monochromator MC at least to a width $\Delta\lambda$ to cover the wavelength scanning range and the wavelength setting device WD to set the grating DG to the designated wavelength. The microcomputer then controls the gain control circuit GC to operate in the previously mentioned manner, so that the photomultiplier tube PT is adjusted to a certain degree of sensitivity.

Then the microcomputer controls the switch controllers $CL_3$ to open the switch $SW_3$ and the switch controllers $CL_1$ and $CL_2$ to close the switches $SW_1$ and $SW_2$, respectively, at the opposite contact b, so that the sensitivity of the light measuring circuit including the photomultiplier tube PT is fixed to the value obtained through the operation of the gain control circuit GC, whereupon the gain control circuit GC stops its operation and with the fixed degree of sensitivity the photodetector PT detects the monochromatic light emerging out of the exit slit $SL_2$ of the monochromator MC to produce an electrical signal in accordance with the intensity of the monochromatic light.

Then the microcomputer CPU controls the slit width setting device SD to narrow the slit width and the wavelength setting device WD to return the grating DG from the designated wavelength position by $\Delta\lambda/2$ and thence turn the grating to a wavelength position of $\lambda'p+(\Delta\lambda/2)$ for wavelength scanning for a position of the grating where the output of the preamplifier PA becomes maximum. Any suitable method of detecting the maximum output may be employed. To take an analog method for example, a holding circuit is connected to the output of the preamplifier PA to hold the maximum value of the output of the preamplifier, and a comparator compares the output of the holding circuit and that of the preamplifier to produce a detection signal when the latter output has become smaller than the former output.

When the slits of the monochromator MC are widened in the wavelength setting mode, the output of the preamplifier PA is applied also to a comparator CM, which compares the output with a value $m \cdot E_R$ wherein $E_R$ is the previously mentioned reference voltage and m is a factor smaller than 1 (one). If the output of the preamplifier PA is smaller than $m \cdot E_R$, the microcomputer CPU causes a warning device not shown to give a visual and/or acoustic warning. Usually, when the slit width of the monochromator MC is widened, the emission line of the spectrum of a sample under measurement necessarily lies within the wavelength scanning range covered by the widened slit width, and the gain control circuit GC operates so that the output of the preamplifier PA becomes equal to $E_R$. Therefore, a smaller output of the preamplifier PA than the value $E_R$ means that there is no spectral emission line within the wavelength scanning range covered by the widened slit width, and this may have been caused by erroneous designation of the wavelength, erroneous operation or disorder of the slit width setting device SD and/or the wavelength setting device WD, or disorder of the light source. The warning device provided in accordance with the invention helps give a warning under such conditions.

Figure 6:
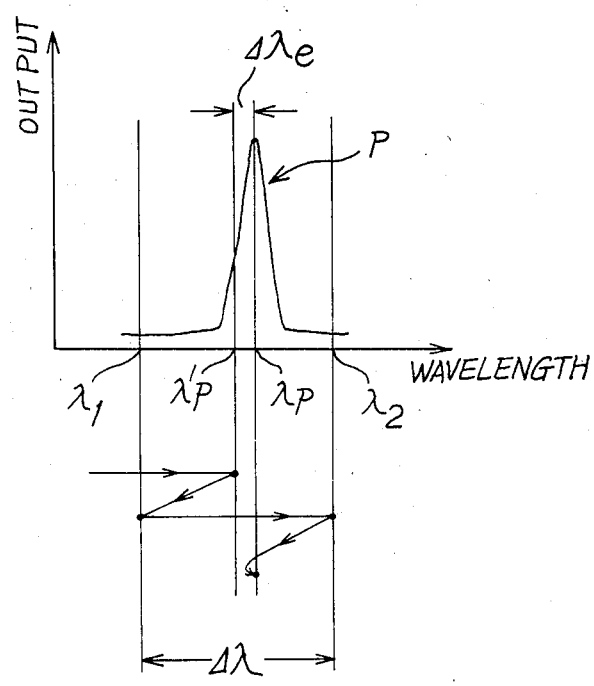
FIG. 6 is a graphical explanation of the process of wavelength scanning in the apparatus of FIG. 1.

FIG. 6 graphically shows the process of wavelength scanning of the monochromator MC in accordance with the invention. In FIG. 6, the output of the preamplifier PA is taken along the ordinate and the wavelength, along the abscissa, with an emission line spectrum of a sample under measurement being designated by P.

First, the grating DG is set to a wavelength position of $\lambda'p$. The slit width of the monochromator when widened covers a wavelength range $\Delta\lambda$ from a lower wavelength of $\lambda 1 = \lambda'p-(\Delta\lambda/2)$ and a higher wavelength of $\lambda 2 = \lambda'p+(\Delta\lambda/2)$. The sensitivity of the light measuring circuit is adjusted in the manner previously mentioned. Then the slit width is narrowed as previously mentioned, and the grating DG is driven from the wavelength position of $\lambda'p$ back to $\lambda 1$ and thence to $\lambda 2$. During the scanning, the peak value of the output from the preamplifier PA is detected at a wavelength $\lambda p$. The microcomputer CPU memorizes the wavelength position of $\lambda p$ and causes the grating to be returned from the wavelength position of $\lambda 2$ to $\lambda p$, where the grating DG is fixed. Actually due to the backlash of the driving mechanism the grating overshoots the position $\lambda p$ slightly and comes back to $\lambda p$.

It is not necessary that the slit width of the monochromator as it is widened should be equal to the range of wavelength scanning provided that substantially the whole emission line spectrum of a sample to be measured is covered by the wavelength range.

Thus, the invention enables automatic correction of errors in wavelength setting in a spectrophotometer. For correction of errors it is necessary to set the sensitivity of the light measuring circuit to a proper degree promptly. If the sensitivity is too high, the amplifier will be saturated as a peak in the spectrum is approached so that it becomes impossible to detect the peak. On the contrary, if the sensitivity is too low, a low signal to noise ratio will result so that it is impossible to detect the peak correctly.

In accordance with the invention, with the slits of the monochromator having been broadened to a sufficient width, the sensitivity of the light measuring circuit is determined so that the output of the measuring circuit becomes an appropriate level. Therefore, even if the wavelength initially set is displaced from the wavelength intended to be selected, it is possible to set the sensitivity of the light measuring circuit to a proper level promptly.

The comparator CM provided in accordance with the invention enables prompt and easy detection of erroneous designation of wavelength, erroneous operation or disorder of the wavelength driving mechanism and other troubles.

What I claim is:

1. A spectrophotometer comprising:
   (a) a light source means for providing a beam of light having an emission line spectrum;
   (b) a monochromator comprising an entrance slit through which said beam of light enters said monochromator, a dispersing means for dispersing said beam of light into a series of wavelengths, an exit slit through which a monochromatic light of a selected one of said wavelengths emerges from said monochromater, a slit width setting means for setting said entrance and exit slits to a same variable width, and a wavelength setting means for setting said dispersing element to such a position as to provide a monochromatic light, corresponding to said position, of one of said series of wavelengths at said exit slit;
   (c) a light measuring means for measuring the intensity of said monochromatic light at said exit slit and producing a corresponding electrical output signal; and
   (d) a control means for controlling said slit width setting means and said wavelength setting means in such a sequential manner that in a wavelength setting mode said dispersing means is set to a position of a designated wavelength, and said slits are widened to a predetermined width so as to measure a beam of light having a spectrum with an emission line at said designated wavelength, and for controlling sensitivity adjusting of said light measuring means so that said output signal is kept at a predetermined constant level, and then said slits are narrowed, whereupon said dispersing means is operated such that wavelength scanning is conducted over a range of wavelengths including said designated wavelength so as to detect a peak in said emission line spectrum, and then said dispersing means is set to said peak position.

2. The spectrophotometer of claim 1, wherein said light source means comprises a hollow-cathode lamp.

3. The spectrophotometer of claim 1, wherein said light measuring means comprises a photomultiplier tube, a preamplifier and a gain control circuit connectable across an output terminal of said preamplifier and said photomultiplier tube to form a dynode feedback circuit.

4. The spectrophotometer of claim 3, wherein the sensitivity of said light measuring means is adjusted by said gain control circuit.

5. The spectrophotometer of claim 2, wherein said light measuring means comprises a photomultiplier tube, a preamplifier and a gain control circuit connectable across an output terminal of said preamplifier and said photomultiplier tube to form a dynode feedback circuit.

6. The spectrophotometer of any one of claims 1–4, or 5 wherein said control device comprises a microcomputer.

* * * * *